United States Patent Office 2,721,190
Patented Oct. 18, 1955

2,721,190

PRODUCTION AND SEPARATION OF POLYCARBOXYLIC ACIDS

Ross A. Hanson, Fullerton, and Orville L. Polly, Long Beach, Calif., assignors to Union Oil Company of California, Los Angeles, Calif., a corporation of California No Drawing. Application July 21, 1951, Serial No. 238,024

9 Claims. (Cl. 260—96.5)

This invention relates to polycarboxylic acids and particularly dicarboxylic acids, to methods for their preparation and to methods of separating complex organic acid mixtures to obtain relatively pure polycarboxylic acids. Particularly the invention relates to a process of preparing dicarboxylic acids free from non-acidic oxygen, i. e., free from hydroxyl groups, ketonic groups, epoxy groups and the like, and to methods of separating these polycarboxylic acids from acid mixtures containing polycarboxylic acids with and without non-acidic oxygen in their molecular structure, which mixtures may also contain monocarboxylic acids with or with non-acidic oxygen.

The invention further relates to the production of polycarboxylic acids, particularly dicarboxylic acids, from paraffin wax by controlled oxidation of the wax followed by separation and fractionation procedures capable of separating the desired polycarboxylic acids from the oxidized wax.

As used herein the terms "non-acidic oxygen," "neutral oxygen" or "non-carboxylic oxygen" refer to any oxygen present in the acid molecules which is not present in a —COOH or —COOR grouping. Moreover, the terms "oxygenated acids" or "oxy acids" refer to acids containing at least one —COOH group and containing non-acidic oxygen.

The production of synthetic resins, plastics and the like, particularly those of the super polyamide type, e. g., nylon, is dependent upon the use of relatively pure dicarboxylic acids and, although the need for dicarboxylic acids has therefore been great, it has been uneconomical heretofore to prepare dicarboxylic acids having more than about 10 carbon atoms in their structure and even the quantities of these lower molecular dicarboxylic acids are, in general, insufficient to meet the market demands. The preparation of the higher molecular weight dicarboxylic acids, i. e., those containing more than about 8 or 10 carbon atoms per molecule, involves complicated synthesis procedures, making the costs of such acids so high as to preclude their use in the preparation of plastic materials suitable for use in the preparation of fabrics and the like. Applicants have found, however, that it is possible to prepare such higher molecular weight dicarboxylic acids and, in fact, acids containing more than 2 carboxyl groups, using a relatively cheap raw material and employing relatively simple oxidation procedures followed by relatively simple methods of fractionation to separate fractions of dicarboxylic acids or even substantially individual dicarboxylic acids containing up to as many as about 30 carbon atoms per molecule. The synthesis of these acids comprises the controlled oxidation of paraffin wax using conditions of oxidation which are found to produce relatively high yields of dicarboxylic acids followed by separation procedures described herein.

In general the oxidation of both liquid and solid paraffinic hydrocarbons by blowing with oxygen-containing gas is old. However, in oxidizing paraffin wax it has in the past been the practice to oxidize the wax to a limited degree with the object of producing fatty acids which can be recovered and converted into glycerides or fats or to oxidize the wax to a much greater extent with the object of producing low molecular weight water-soluble dicarboxylic acids. Thus it is known to oxidize paraffin wax until the acid number of the product is above about 300 mg. KOH/g., extract the product with water to recover low molecular weight water-soluble mono- and dicarboxylic acids and return the higher molecular weight water-insoluble fraction of the oxidation product for further oxidation to produce more of the lower molecular weight water-soluble acids. Resolution of the higher molecular weight fraction of this highly oxidized wax to recover acid fractions consisting of substantially pure dicarboxylic acids has not heretofore been possible.

It has been found that by a suitable choice of feed stocks and conditions of oxidation the oxidation may be directed to the selective production of acids containing 2 or more carboxyl groups per molecule. In producing these polycarboxylic acids appreciable quantities of acids containing 1 or more carboxyl groups and containing non-carboxyl or non-acid oxygen are produced. However, these oxygenated acids may be readily separated from the desired non-oxygenated acids by methods described herein to obtain the desired acids of this invention. Moreover, the separated monocarboxylic acids may be further oxidized if desired to produce additional quantities of the polycarboxylic acids.

Thus it has been found that by oxidizing paraffin wax at temperatures between about 100° C. and 140° C. and pressures preferably between about 50 and about 500 p. s. i. g. (pounds per square inch gauge) pressure until the product has an acid number of at least about 240 and preferably between about 250 and 375 mg. KOH/g., the product will contain relatively high proportions of polycarboxylic acids, appreciable quantities of which contain no oxygen other than that present in carboxyl groups and others which do contain non-acidic oxygen. The oxidized mass is substantially free from unoxidized hydrocarbons and is found to be a non-waxy fluid material. Although the preferred range of acid number of the oxidized product is between about 250 and 375 mg. KOH/g., the desired high molecular weight dicarboxylic acids are present and may be recovered in the same manner from oxidized waxes having acid numbers as high as 450 to 500 mg. KOH/g.

It has also been found that it is possible to separate from the complex oxidation product a series of dicarboxylic acids containing from 8 to about 28 or 30 carbon atoms per molecule, which acids are obtained as white or colorless crystals and after simple purification have relatively sharp melting points. Moreover it is found that a fraction of monocarboxylic acids free from non-acidic oxygen is readily separated from the complex acid mixture obtained during the oxidation in carrying out the fractionation to obtain the desired di- and poly-carboxylic acids.

It is thus an object of this invention to provide a method for the synthesis of polycarboxylic organic acids and it is another object to provide a method for the oxidation of paraffin wax whereby high yields of polycarboxylic acids are obtained.

Another object of the invention is to produce relatively pure high molecular weight polycarboxylic acids from hydrocarbons and it is a further object to produce relatively pure polycarboxylic acids which are substantially free from non-acidic or non-carboxylic oxygen.

Another object of the invention is to provide a method for separating polycarboxylic acids free from non-carboxyl oxygen from complex acid mixtures containing oxygenated polycarboxylic acids, and it is a further object to provide a method for separating a mixture of mono- and poly-carboxylic acids, which acids may or may not contain neutral oxygen, into a fraction consisting of monocarboxylic acids free from non-acidic oxygen, a fraction consisting of polycarboxylic acids free from non-acidic oxygen and a fraction consisting of oxygenated mono- and polycarboxylic acids.

It is a further object of this invention to provide a process for the preparation and separation of a series of non-oxygenated dicarboxylic organic acids ranging from succinic acid to acids containing as many as 30 carbon atoms per molecule, all of which acids are obtained in crystalline form and substantially free from oxygenated mono- or polycarboxylic acids.

It is a further object of this invention to provide a method for the preparation of high molecular weight dicarboxylic acids which are free from non-acidic oxygen, are obtained in relatively pure crystalline form and are suitable for use in the production of synthetic resins, plastics and the like and particularly poly amide-type products where light-colored products are desirable.

Another object of the invention is to separate from a complex mixture of oxygenated and non-oxygenated carboxylic acids a series of dicarboxylic acids containing from 8 to about 30 carbon atoms per molecule and separating these acids into fractions consisting of substantially individual acids or at least mixtures of acids having carbon atom contents differing by not more than 2 or 3 carbon atoms per molecule.

The invention involves the controlled oxidation of a petroleum wax such as paraffin wax by blowing the wax with air, oxygen-enriched air or other gas containing free oxygen at elevated temperatures until a relatively high acid content has been obtained and separating from the resulting acid product the desired polycarboxylic acids. The separation of the desired acids may be carried out by several different processes which have in common the use of urea as a means of segregating acids free from non-acidic oxygen from acids containing non-acidic oxygen, the urea treatment being applied to esters of the acids.

In one modification the oxidized paraffin wax is esterified with a relatively low molecular weight normal monohydroxy alcohol. The esters are then treated with urea to effect a separation between the esters of acids containing non-acidic oxygen and those free from non-acidic oxygen. The procedures for carrying out the urea separation will be more fully described hereinbelow. Following the urea separation the esters of the acids free from non-acidic oxygen are saponified and acidified and finally the dicarboxylic acids present in the resulting mixture are separated from monocarboxylic acids by crystallization from a hydrocarbon solvent. Many modifications of this basic procedure may be employed and will be described herein, each modification having advantages and disadvantages in relation to each other modification.

The method of separation of the acid fraction described above and substantially all of the modifications described hereinbelow are applicable to the separation of carboxylic acid mixtures containing oxygenated and non-oxygenated carboxylic acids regardless of how such mixtures are produced and whether or not such mixtures contain all of the types of carboxylic acids which are believed to be present in the oxidized product resulting from the controlled oxidation of paraffin wax, as described herein.

To illustrate the invention, a deoiled paraffin wax having a melting point of about 55° C. was blown with air at a temperature of about 130° C. and a pressure of about 100 p. s. i. g. for about 160 hours. The resulting product had an acid number of 300 mg. KOH/g. The air blowing was effected in an oxidation vessel equipped with temperature control means and with a distributor for the air to insure adequate dispersion in the liquid being oxidized. The air blowing rate was approximately 10 standard cubic feet of air per barrel of hydrocarbon per minute, the barrel referred to being the 42-gallon barrel of the petroleum industry. This product was saponified using 50° Bé. caustic in the presence of about 2 volumes of methyl alcohol. The mixture was refluxed for 2 hours. At this time the sodium soaps were converted to their methyl esters by adding 5% excess of sulfuric acid over that required to convert the sodium soaps to acids and continuing the refluxing for about an hour. The free alcohol was then partially removed from the mixture by distillation and the resulting esters were washed with water to remove the remaining methanol and with dilute sodium bicarbonate to remove unreacted organic acids present in the ester layer and finally with water. The product was extracted twice with equal volumes of a petroleum naphtha having a boiling range of about 160° F. to about 215° F. and the insoluble material, consisting of polymeric acid esters comprising carboxylic acids having more than 2 carboxyl groups per molecule, separated from the naphtha-soluble ester material.

The naphtha solution of esters was mixed vigorously at room temperature with a slurry of urea in methanol using about 10 lbs. of urea per gallon of methanol. After stirring for approximately 2 hours the product was filtered to separate an insoluble adduct formed by the urea and the carboxylic acids free from non-acidic oxygen and the filter cake washed with additional quantities of naphtha. The resulting filtrate and washings contain the mono- and poly-carboxylic acids containing non-acidic oxygen. This material may be further handled for the recovery of oxygenated acids as by saponification and acidification or it may be separated from naphtha as by distillation and used without further processing as a resin plasticizer, modifier or the like. These and other methods for the recovery and treatment of the acids containing non-acidic oxygen will be discussed hereinbelow.

The washed filter cake consisting of the urea-carboxylic acid adduct was placed in 2 volumes of water and heated. This treatment released the urea and freed the esters which were obtained as an insoluble phase. After separating the ester phase it was water washed to remove urea. The urea is readily recovered from the water phase by evaporation and crystallization and may be reused in the process.

The resulting ester fraction was fractionally distilled using a vacuum of approximately 1 mm. of mercury pressure and separated into 13 fractions, i. e., 12 overhead fractions and a bottoms fraction, the latter amounting to aproximately 20% of the total ester fraction. Each of the resulting fractions was saponified using 50° Bé. caustic in the presence of 2 volumes of naphtha. Each of the resulting mixtures were separated into a naphtha phase and an aqueous phase and in each instance the aqueous phase was acidified with sulfuric acid to release the acids. The released acids in each case were dissolved in about 1 volume of hot naphtha and permitted to cool to effect crystallization of the dicarboxylic acids present in the mixture. The naphtha solution, after filtering to remove dicarboxylic acids, was evaporated, leaving monocarboxylic acids free from non-acidic oxygen. The average molecular weights of the dicarboxylic acids present in each of the above fractions varied between about 201 for the first distillate fraction to about 444 for the final distillate fraction and over 500 for the distillation residue fraction. Thus the acids present in the distillate fractions varied in carbon atom content from about 10 to about 25 and the average carbon atom content of the bottoms fraction was about 30. These products were all light-colored crystalline acids relatively sharp melting points and, upon recrystallization from naphtha, were substantially colorless crystalline compounds having relatively sharp melting points.

Suitable paraffin wax for use in the preparation of high molecular carboxylic acids is a wax which is relatively oil-free, such as one which has been prepared by modern solvent refining technique. Thus, a topped waxy residuum is extracted with liquefied propane to separate asphaltic materials from the oil and the deasphalted oil in propane solution is subsequently chilled to temperatures in the neighborhood of —40° to crystallize wax which may then be separated from the propane-oil solution. The precipitated wax, which contains oils, is dissolved in a solvent such as methyl ethyl ketone and chilled to precipitate a deoiled wax. Such dewaxing and deoiling processes are well known and are described in U. S. Patent No. 2,229,658. The wax thus obtained by this and other solvent refining processes is relatively free of objectionable materials for wax oxidation purposes. The melting point of the refined wax is generally above 32° C. and may be as high as 75° C. or even higher. Refined paraffin waxes having melting points in the range of about 45° C. to 75° C. are available on the market and are desirable oxidation stocks for use in the preparation of the acids of this invention. Although solvent refining gives a very desirable wax, waxes refined by other methods and waxes from other sources may be used in the process of this invention. Such other waxes include refined tank bottoms wax, sucker rod wax, and waxes derived from other petroleum materials. Preferably, the waxes employed as feed stocks will have a melting point between about 50° C. and 75° C., although, as indicated above, lower and higher melting point waxes may be employed, i. e., waxes melting as low as 32° C. such as those obtainable from lighter fractions of petroleum, as well as refined tank bottoms which may have a melting point as high as about 93° C. to 95° C.

The above described waxes comprise predominantly paraffinic and possibly isoparaffinic hydrocarbons having between about 15 and 50 carbon atoms per molecule. Preferably, the wax to be employed will contain hydrocarbon molecules having between about 20 and about 35 carbon atoms per molecule.

The oxidation of the paraffin wax is carried out in the liquid phase at a temperature above the melting point of the wax and below about 140° C. or 150° C. The preferred temperature is between about 100° C. and 130° C. and it is in this temperature range that the greatest yield of the desired acids is obtained. Higher temperatures appear to promote the decomposition or the further modification of the desired acidic materials. Moreover, the extent of oxidation appears to be important. Thus, the oxidation of the wax which is effected by air blowing the wax at a temperature within the limit described and at a pressure between about 50 and 500 p. s. i. g. is continued until the acid number of the oxidized material is between 240 and 375 mg. KOH/g. Preferably, the acid number of the oxidized material will be between 250 and 350 mg. KOH/g. If the oxidation is discontinued at acid numbers below about 240 mg. KOH/g., the yield of the desired products is negligible or at least low and the yield of monocarboxylic acids is relatively high, whereas if the oxidation is continued beyond the upper limit of acid number mentioned the rate of production of the desired acids appears to decrease to an uneconomical point.

The term "acid number" as used herein represents the numerical value of the acidity and is determined by the method described in A. S. T. M. Standards on Petroleum Products and Lubricants, October 1947, page 639. The term "saponification number" as used herein is the saponification equivalent as determined by the method described in A. S. T. M. Standards on Petroleum Products and Lubricants, October 1947, page 639.

Although air was indicated to be the oxygen-containing gas to be employed in the oxidation, somewhat improved oxidation rates may be obtained by employing oxygen-enriched air so that the gas contains as much as 30% or 40% oxygen. It is possible that the increased oxygen content of the gas employed in the oxidation steps affects the relative rate of formation of di- or other polycarboxylic acids in relation to other acids, and particularly in relation to those acids containing non-acidic oxygen. In this connection, it is noted that although paraffin wax may be oxidized at ordinary pressure, the proportionate yield of the desired polycarboxylic acids is greater where pressures in excess of 50 p. s. i. g. are employed. Apperently the partial pressure of oxygen thus influences the rate of formation of the desired polycarboxylic acids.

It is to be noted further that a fine dispersion of oxidizing gas is desirable and for this reason the use of porous, ceramic, glass, metal or other plates or cones or the like, as a means of distributing the air, is preferable to the use of ordinary spiders, which are often employed in air blowing operations. It is to be understood that the oxidation may be effected in a batch-wise or continuous manner, as would be understood by those skilled in the art, providing the conditions are those mentioned and that the time of oxidation is sufficient to produce a product having an acid number within the desired range.

The oxidized wax as produced by the methods described hereinabove is a fluid, non-waxy product in which substantially all of the hydrocarbon molecules have been oxygenated and most of the molecules contain carboxylic acid groupings. Only a very small proportion of the oxidation product consists of hydrocarbon molecules containing only non-acidic oxygen. The acids present in the oxidate are believed to consist of fatty acids, oxygenated fatty acids, i. e. fatty acids containing hydroxyl and/or carbonyl groups, dicarboxylic acids free from non-acidic oxygen, dicarboxylic acids containing non-acidic oxygen and probably some polycarboxylic acids containing more than 2 carboxyl groups per molecule, which will be referred to herein as "polymerized acids." It is believed that some of these latter acids contain non-acidic oxygen and others are free from non-acidic oxygen. Moreover, since the saponification number of the acid mixture is greater than the acid number it is believed that there is an appreciable proportion of lactones, lactides or the like which will be referred to as "inner esters." This complex mixture of acids and inner esters may be fractionated in various ways to obtain a separation or fractionation of the mixture into somewhat less complex acid mixtures prior to treatment with urea if desired, however, generally it is only necessary to wash the oxidized product with water before proceeding with the separation process of this invention.

Upon extraction with water the oxidation product may be separated into a water-soluble fraction and a water-insoluble fraction. The water-soluble fraction comprises low molecular weight fatty acids, i. e. fatty acids containing up to about 6 carbon atoms per molecule, oxygenated fatty acids containing up to about 8 or 10 carbon atoms per molecule, dicarboxylic acids containing up to about 9 or 10 carbon atoms per molecule as well as oxygenated dicarboxylic acids of similar carbon atom content, and possibly some of the lower molecular weight polymerized carboxylic acids. This fraction, which will be referred to as the water-soluble acid fraction of paraffin wax oxidate, may be separately handled for the recovery of the lower molecular weight mono and dicarboxylic acids.

The water-insoluble portion of the oxidized paraffin wax contains the higher molecular weight acids of each of the classes described above. This fraction may be further separated into a naphtha-soluble fraction and a naphtha-insoluble fraction by extraction with a hydrocarbon solvent or naphtha, however, this separation is not sufficiently selective to permit the recovery of separate classes of acids. It is found that the proportion of oxygenated acids and that the proportion of dicarboxylic acids is higher in the naphtha-insoluble fraction than in the naphtha-soluble fraction, however, each of the fractions contain some acids of each of the types described above.

Fractional distillation of the acids is not effective in separating acid types and leads to decomposition of the acids even though distillation is effected under vacuum.

It has not been possible by either of the methods described, i. e. extraction or distillation or even using a combination of these two processes, to obtain individual acids or to realize the separation of acid types permitting the recovery of any given class of acids from the oxidation mixture except for the lower molecular weight dicarboxylic acids such as succinic acid which is recoverable from the water-soluble acid fraction.

Following the methods of this invention, it is possible to obtain from the oxidation product dicarboxylic acids in the molecular weight ranges heretofore unavailable and it is found possible to obtain these acids in relatively good yields and in substantially pure form. Thus by the simple expedient of converting the water-insoluble acid fraction into its methyl or ethyl ester and extracting the mixture of esters with alcoholic slurries of urea it is possible to separate different classes of acids. Thus, the use of urea permits a sharp separation between the acids which do and those which do not contain hydroxyl groups, carbonyl groups and the like. Following such separation and following saponification of the esters and acidification of the resulting soaps, the dicarboxylic acids free from non-acidic oxygen are readily separated from the monocarboxylic acids free from non-acidic oxygen by a simple crystallization procedure. The dicarboxylic acids are less soluble in hydrocarbon solvents such as naphtha, particularly at ordinary temperatures than the monocarboxylic acids or fatty acids.

It is to be pointed out that the urea method of separation mentioned above is applicable to the separation of non-oxygenated carboxylic acids from oxygenated carboxylic acids regardless of the source of these acids. However, it is to be noted that the carboxylic acids must contain at least about 8 and preferably about 10 or more carbon atoms per molecule in order to be capable of forming adducts with urea. For this reason separation of the water-soluble acid fraction by means of urea does not remove all of the dicarboxylic acids free from non-acidic oxygen in the form of urea adducts and is therefore not generally practicable. However, the lower molecular weight acids present in the water-soluble acid fraction are found to be recoverable by simple distillation of the acids themselves or by fractional distillation of the methyl or other low molecular weight alcohol esters of the acids, followed by conversion of the esters to acids and crystallization of various fractions of dicarboxylic acids.

Since the oxidized wax contains dicarboxylic acids varying from about $C_4$ acids to about $C_{30}$ acids, a preferred method of treatment of the oxidate is to first wash with two 2–3 volume portions of water to separate the lower molecular weight acids from those of higher molecular weight. By using water at approximately room temperature and thoroughly agitating the water-oxidate mixture to insure good contact it is possible to extract from the oxidate those dicarboxylic acids containing up to about 8 or 9 carbon atoms per molecule along with lower molecular weight monocarboxylic acids and oxy acids and leave the dicarboxylic acids containing 9 or 10 and more carbon atoms per molecule in the water-insoluble fraction. This separation is desirable for at least two reasons. In the first place the lower molecular weight dicarboxylic acids do not readily form adducts with urea and therefore are not completely recovered in the urea separation treatment such as is applied to the water-insoluble fraction, and these lower molecular weight acids are recoverable from the water-soluble fraction by a relatively simple procedure. Thus, the water extract is evaporated to remove the major portion of water, the remaining traces of water being removed by distilling under reflux with a water trap in the reflux line using a carrying agent for the water. Benzene or toluene is a satisfactory carrying agent for this purpose. Following removal of water a large proportion of the succinic acid present in the water extract is recoverable by cooling the water-soluble acid fraction. Succinic acid crystallizes out and may be removed by filtration. Following filtration to remove the succinic acid, the remaining portion of the water-soluble acid fraction is esterified with methyl alcohol by any well known procedure and the resulting esters fractionally distilled in order to separate the esters into fractions of gradually increasing molecular weight. The fractions are separately saponified and the resulting soaps acidified to obtain the acids. Cooling the resulting acid fractions, preferably with added hexane, causes the crystallization of dicarboxylic acids, leaving monocarboxylic acids and possibly oxydicarboxylic acids in solution. Molecular weight and acid number determinations on the various crystalline fractions indicate the presence of $C_5$ to $C_8$ or $C_9$ dicarboxylic acids in relatively pure form.

The water-insoluble fraction obtained as above following extraction with water at ordinary temperatures is preferably heated to remove dissolved water and esterified by any of the methods well known in the art, but preferably by the method described hereinabove, i. e. by converting the acids into their sodium soaps by treatment with caustic in the presence of methyl alcohol and adding sulfuric acid to the alcohol solution of soaps to form the esters directly. The resulting esters are then treated with urea in the manner described hereinabove, the urea adducts being separated from the esters which do not form urea adducts and subsequently decomposed to recover the urea, saponified and acidified to obtain acids free from non-acidic oxygen, which acids may then be permitted to crystallize, preferably from naphtha solution, to obtain dicarboxylic acids as crystalline products leaving monocarboxylic acids in the naphtha solution.

Preferably the urea adduct is decomposed to obtain the free esters and urea, and the esters fractionally distilled in order to obtain a series of ester fractions of gradually increasing molecular weight. These ester fractions may then be saponified, acidified and the acids crystallized as above described to obtain crystalline dicarboxylic acids. In this case each fraction of acids, depending upon the efficiency of fractionation and upon the number of fractions taken, will be individual acids or mixtures of acids varying not more than 2 or 3 carbon atoms per molecule within a given fraction. Such individual acids or mixtures of acids have utility as chemical intermediates where relatively pure, high molecular weight aliphatic dicarboxylic acids are required.

Alcohols which may be employed to produce the esters of the acids obtained by oxidation either before or after water washing include the lower molecular weight normal monohydroxy aliphatic alcohols containing from about 1 to 9 or 10 carbon atoms per molecule. Methyl alcohol is particularly suitable; however, ethyl, propyl, butyl and other lower alcohols may be employed within the limits indicated.

Although in the above typical examples esterification of the wax oxidate was effected by first converting the aliphatic acids to their sodium soaps and acidifying the soaps at elevated temperatures in the presence of alcohol, other methods of esterification may be employed. Thus, the acidic oxidation products, either before or preferably after water-washing may be heated with alcohol in the presence of an esterification catalyst, as by refluxing at the boiling point of the alcohol employed, and the esters obtained in this manner may be used in the subsequent separation process. It is to be noted, however, that a distinct advantage arises following the procedure outlined hereinabove in that during the initial saponification wherein the oxidation product or fraction thereof is converted into its sodium salt, the treatment results in the saponification of inner esters which are normally present in the wax oxidate and by esterifying during the acidification of the sodium salts or soaps the tendency to reform inner esters is reduced, thus increasing the yield of the desired methyl or other lower aliphatic alcohol ester of the acids.

The amounts of urea to be employed in the treatment of ester fractions will depend upon the relative content of acids free from non-acidic oxygen. Generally it has been found that in treating such esters between about 0.5 and 1.5 parts by weight of urea per part of ester mixture gives complete recovery of the acids free from non-acidic oxygen. Equal parts by weight of urea and esters are usually employed. The urea, which is preferably in powdered form may all be added at one time or it may be used in two or more portions. In such cases the insoluble adduct formed by one treatment is removed by filtration before the next portion of urea is added.

The urea is preferably employed as a slurry in methyl alcohol. A slurry of approximately equal parts by weight of urea and methyl alcohol is particularly suitable; however, as little as 0.75 part and as high as 2 parts by weight of alcohol per part of urea may be employed.

Although it is possible to form urea adducts using the ester fraction without dilution, in order to obtain the most efficient separation it is necessary to dilute the ester fraction being treated with a hydrocarbon solvent such as a petroleum thinner or naphtha prior to mixing it with the urea slurry. Preferably about 3 volumes of hydrocarbon solvent per volume of ester fraction will be employed although good separations are obtained using as little as 1 volume of solvent and as high as 10 volumes of solvent per volume of ester fraction.

In extracting with urea, the esters, or naphtha solution of esters, is preferably maintained at about room temperature and the urea slurry is added at the same temperature. Following the addition of the slurry the mixture is stirred or otherwise agitated for approximately 1–2 hours or longer and the resulting product filtered. The urea adduct which is insoluble in the mixture may be washed on the filter with additional naphtha if desired.

The adduct is decomposed to recover the urea and the esters by adding between about 2 and about 8 or 10 volumes of water and agitating the mixture. After decomposition has occurred the mixture is permitted to stratify and the aqueous layer is separated and evaporated to recover the urea. The recovered esters may be fractionally distilled as indicated herein and each fraction separately saponified or the total ester fraction may be saponified by any well known procedure such as by treatment with 5–10% excess alcoholic sodium or potassium hydroxide and the resulting soaps acidified with mineral acid, e. g., 5% excess of 10% to 20% sulfuric acid. The recovered acids, after separation from water and inorganic salts, are dissolved in 1 to 4 or 5 volumes of hexane or other low boiling paraffinic hydrocarbon or hydrocarbon fraction at about 75° C. and cooled. By regulating the rate of cooling and by filtering to recover crystalline acids in increments as the crystals form, it is possible to effect fractionation of the acids. The final crop of crystals is removed at between room temperature and about 0° C. The acids crystallized in this manner are substantially pure dicarboxylic acids which are free from non-acidic oxygen.

Monocarboxylic acids are recoverable from the mother liquor from the above crystallization process by evaporating the hexane or other hydrocarbon solvent and dissolving the residue in a polar solvent such as an alcohol, e. g., methyl alcohol, ethyl alcohol, isopropyl alcohol, etc. at about 65° C. and cooling the solution to effect crystallization of the monocarboxylic acids. In this manner aliphatic monocarboxylic acids having from about 9 to as high as 25 to 30 carbon atoms per molecule have been recovered.

The following specific examples will serve to illustrate the invention.

EXAMPLE I

About 9,000 parts by weight of a refined petroleum wax having a melting point of 55° C. were introduced into an oxidation vessel provided with heating and cooling coils, and with means for introducing and dispersing air at a point near the bottom of the vessel. Wax was heated to a temperature of 130° C. at a pressure of about 95 p. s. i. g. Air was introduced into the oxidation vessel at a rate of approximately 5.5 cu. ft./bbl./min. After approximately 18 hours the oxidation reaction had begun to progress satisfactorily as indicated by the development of acids in the wax and by a reduction in the oxygen content of the air being bled from the oxidation unit and at this time the temperature was decreased to about 125° C. The air blowing was continued for a total of about 180 hours at which time the acid number of the oxidized wax was about 300 mg. KOH/g.

The product, amounting to about 9500 parts by weight was washed with two 2-volume portions of hot water (95° C.) to remove water-soluble constituents. After settling and removal of the aqueous phase containing the lower molecular weight water-soluble mono and dicarboxylic acids there remained about 6500 parts by weight of water-insoluble wax oxidate having an acid number of 180 and a saponification number of 340. This product will be referred to hereinafter as "product A."

About 3,000 parts by weight of product A was extracted with a light petroleum naphtha having a boiling range of 50° C. to 85° C. Two washes were employed using approximately two volumes of the petroleum naphtha per volume of product A for each wash. The naphtha phases were combined and the naphtha removed by evaporation leaving approximately 1,000 parts by weight of naphtha-soluble water-insoluble wax oxidate.

The naphtha-insoluble fraction following extraction was heated to approximately 120° C. to evaporate dissolved naphtha and the resulting product amounted to 2,000 parts by weight. This product which will be referred to hereinafter as "product B," had an acid number of about 160 mg. KOH/g.

EXAMPLE II

Two thousand parts by weight of product A from Example I was treated with two volumes of methanol and 2% by weight of concentrated sulfuric acid at 50° C. to effect esterification. The resulting methyl esters, after removal of excess alcohol and sulfuric acid by water washing, were diluted with 2 volumes of a paraffinic hydrocarbon thinner boiling in the range of 70° C. to 165° C. A small amount of material which was rejected from solution was discarded. This rejected material consisted primarily of unesterified acids and insoluble esters. The naphtha solution of methyl esters was thoroughly mixed with 35 weight per cent of urea, based on the naphtha solution, slurried in an equal volume of methanol. After mixing and agitating for approximately 3 hours the insoluble urea adduct was removed by filtration and the naphtha-alcohol solution obtained as a filtrate was evaporated leaving the esters of mono and dicarboxylic acids containing non-acidic oxygen. These esters were saponified using 5% excess alcoholic KOH and the resulting potassium soaps were acidified with dilute $H_2SO_4$ to reform the acids. Analysis of this acid fraction indicates the presence of between 1.5 and 2 atoms of non-acidic oxygen per molecule of acid.

The urea adduct was decomposed by agitating it with 2.5 volumes of water at about 80° C. The water layer was then separated and evaporated and urea recovered as crystals from the cooled partially evaporated solution. The oily layer consisting of methyl esters of mono and dicarboxylic acids free from non-acidic oxygen was distilled under vacuum into 3 overhead cuts and a bottoms fraction. Cut 1 consisted of material boiling up to 160° C. at 1 mm. Hg pressure. Cut 2 consisted of material boiling between 161° C. and 204° C. finishing at 0.3 mm. Hg pressure, and Cut 3 consisted of material boiling between 204° C. and 240° C. finishing at 1.2 mm. Hg pressure. At this temperature a slight amount of cracking or decomposition was observed.

The following table illustrates the characteristics of the overhead fractions of methyl esters from the above distillation:

*Table 1*

| Cut No. | Saponification No., Mg. KOH/g. | Average Molecular Weight [1] | Carbon, Percent | Hydrogen, Percent | Oxygen, Percent |
|---|---|---|---|---|---|
| 1 | 248 | 217 | 71.7 | 11.6 | 16.7 |
| 2 | 193 | 258 | 74.5 | 12.2 | 13.3 |
| 3 | 154 | 310 | 76.6 | 12.8 | 10.6 |

[1] Determined by ebullioscopic method using benzene.

Each of the above cuts was separately saponified using KOH and the resulting potassium salts were converted to the corresponding acids by acidifying with excess dilute sulfuric acid. The acids were water-washed to remove inorganic acids, salts and methanol, and dried. The acids so obtained were dissolved in hot paraffinic petroleum solvent boiling between 60° C. and 71° C., using approximately 3 volumes of solvent, and the mixture was cooled. In the case of the acids from the first distillation cut, a single crop of crystals was recovered after cooling to approximately 40° C. These crystals were analyzed and found to have a composition corresponding to a $C_{11}$ aliphatic dicarboxylic acid. Data regarding these acids are shown in the following table:

*Table 2*

| | Acid No., Mg. KOH/g. | Percent by Weight of— | | |
|---|---|---|---|---|
| | | Carbon | Hydrogen | Oxygen |
| Found | 519 | 61.5 | 9.5 | 29.0 |
| Calculated for: $(CH_2)_9(COOH)_2$ | 520 | 61.1 | 9.3 | 29.6 |

In the case of cut 2, three crops of crystals were recovered as the solvent solution of acids was cooled to room temperature. Data regarding these crystalline products are shown in the following table:

*Table 3*

| | Acid No., Mg. KOH/g. | Percent by Weight of— | | |
|---|---|---|---|---|
| | | Carbon | Hydrogen | Oxygen |
| Crystal Crop No. 1: | | | | |
| Found | 362 | 67.3 | 10.8 | 21.9 |
| Calculated for: | | | | |
| $(CH_2)_{15}(COOH)_2$ | 399 | 65.8 | 11.4 | 22.8 |
| $(CH_2)_{16}(COOH)_2$ | 357 | 68.8 | 10.8 | 20.4 |
| Crystal Crop No. 2: | | | | |
| Found | 308 | 72.0 | 11.0 | 17.0 |
| Calculated for: | | | | |
| $(CH_2)_{20}(COOH)_2$ | 303 | 71.4 | 11.3 | 17.3 |
| Crystal Crop No. 3: | | | | |
| Found | 226 | | | |
| Calculated for: | | | | |
| $(CH_2)_{19}(COOH)_2$ | 226 | | | |

Following the removal of the third crop of crystals the mother liquor was evaporated to remove solvent and the residue dissolved in two volumes of absolute alcohol at a temperature near the boiling point of the mixture. The solution was then cooled to room temperature while slowly adding approximately 0.5 volume of water. The crystals which separated were removed by filtration and recrystallized from aqueous alcohol. This product was analyzed and found to consist of aliphatic mono-carboxylic acids free from non-acidic oxygen as indicated by the data presented in the following table:

*Table 4*

| | Acid No., Mg. KOH/g. | Percent by Weight of— | | |
|---|---|---|---|---|
| | | Carbon | Hydrogen | Oxygen |
| Found | 190 | 75.9 | 12.9 | 11.2 |
| Calculated for: | | | | |
| $CH_3(CH_2)_{16}COOH$ | 197 | 76.0 | 12.7 | 11.3 |
| $CH_3(CH_2)_{17}COOH$ | 188 | 76.5 | 12.8 | 10.7 |

The acids from distillation cut 3 were crystallized in the same manner as described above but in this case only two crops of crystals were recovered; the first crop at a temperature of about 42° C. and the second at about 30° C. Data regarding these acids indicate that the acids present in crop 1 correspond to the formula $(CH_2)_{19}(COOH)_2$ and those in crop 2 correspond to the formula $(CH_2)_{23}(COOH)_2$.

EXAMPLE III

Approximately 2,000 parts of product B from Example I, i. e., the water-insoluble naphtha-insoluble acids from oxidized paraffin wax, was treated with 5% excess NaOH in the form of a 20 weight per cent aqueous solution to convert the acids to soaps. The soaps were then dehydrated using a drum-type drier at about 150° C. The dried soaps were converted to methyl esters by treatment with 2 volumes of methanol and 2 weight per cent excess of concentrated sulfuric acid in an open vessel with stirring at a temperature of about 55° C. for approximately 6 hours. The resulting solution of esters in excess methanol was filtered to remove inorganic salts and the filtrate then washed with water to remove mineral acid, methanol and residual salts. The product was diluted with 3 volumes of light petroleum thinner and subsequently washed with a 10% solution of sodium carbonate to remove unesterified acids. A small amount of an insoluble oily phase consisting of naphtha-insoluble acids and esters was discarded. Finally the solution was washed with water leaving a thinner solution of substantially pure methyl esters of water-insoluble, naphtha-insoluble acids.

The ester solution was thoroughly agitated for approximately two hours with 25 weight per cent of urea, based on the thinner solution, slurried in an equal volume of methanol. The product was filtered to recover the insoluble urea adduct and the filtrate retreated in the same manner with a second slurry of urea in methanol using approximately one-half the amount of urea used in the initial treatment. The product was again filtered.

The combined urea adducts were decomposed by treatment with three volumes of water at about 80° C. The water layer was separated and evaporated to recover the urea. The ester layer was water washed to remove urea and then fractionally distilled into 3 overhead cuts and a bottom fraction. Cut 1 was taken at still head temperatures up to 200° C. at 1 Hg pressure. Cut 2 was taken at temperatures between 200° C. and 232° C. at 1 mm. Hg pressure. Cut 3 was taken between 232° C. and 288° C. finishing at 0.3 mm. Hg pressure. The bottoms fraction was not further treated but each of the overhead cuts was further separated by fractional distillation into four equal volume fractions, i. e., 3 overhead cuts and bottoms fraction. These latter fractions will be referred to hereinafter as fractions 1a, b, c, and d for the three overhead cuts and bottoms fraction, respectively, from cut 1 of the initial fractional distillation. Correspondingly the secondary fractions of cuts 2 and 3 will be referred to as fractions 2a, b, c and d, and fractions 3a, b, c, and d.

Four of the above fractions, i. e., fractions 1a and c, fraction 2a and fraction 3a after saponification and acidification to reform the acids were fractionally crystallized from naphtha in the manner described in Example II and the crystalline acids so obtained were analyzed to determine their composition.

In the case of fraction 1a, three crops of crystals were recovered. Crop 1 was obtained by filtration following cooling of the naphtha solution to about 45° C., crop 2 after cooling to room temperature and crop 3 after evaporating part of the naphtha. Data regarding these crystalline acids were as follows:

Table 5

| | Acid No., Mg. KOH/g. | Percent by Weight of— | | |
|---|---|---|---|---|
| | | Carbon | Hydrogen | Oxygen |
| Crystal Crop No. 1: | | | | |
| Found | 591 | 58.3 | 8.9 | 32.8 |
| Calculated for: | | | | |
| $(CH_2)_7(COOH)_2$ | 595 | 57.5 | 8.5 | 34.0 |
| Crystal Crop No. 2: | | | | |
| Found | | 60.1 | 8.5 | 31.4 |
| Calculated for: | | | | |
| $(CH_2)_8(COOH)_2$ | | 59.4 | 8.9 | 31.7 |
| Crystal Crop No. 3: | | | | |
| Found | 522 | | | |
| Calculated for: | | | | |
| $(CH_2)_9(COOH)_2$ | 518 | | | |

The above data indicate that fraction 1a contained $C_9$, $C_{10}$, $C_{11}$ and possibly higher dicarboxylic acids.

Fraction 1c was separated by fractional crystallization from naphtha into three crystal crops. Data regarding the three crystal crops were as follows:

Example 6

| | Acid No., Mg. KOH/g. | Percent by Weight of— | | |
|---|---|---|---|---|
| | | Carbon | Hydrogen | Oxygen |
| Crystal Crop No. 1: | | | | |
| Found | 491 | 62.4 | 9.7 | 27.9 |
| Calculated for: | | | | |
| $(CH_2)_8(COOH)_2$ | 487 | 62.7 | 9.6 | 27.8 |
| Crystal Crop No. 2: | | | | |
| Found | 461 | 63.0 | 9.6 | 27.4 |
| Calculated for: | | | | |
| $(CH_2)_{11}(COOH)_2$ | 459 | 63.9 | 9.8 | 26.2 |
| Crystal Crop No. 3: | | | | |
| Found | 440 | 64.4 | 10.0 | 25.4 |
| Calculated for: | | | | |
| $(CH_2)_{12}(COOH)_2$ | 434 | 65.1 | 10.1 | 24.8 |

The above acids are dicarboxylic acids containing 12, 13 and 14 carbon atoms per molecule.

Fraction 2a was fractionally crystallized from naphtha and two crops of crystals were recovered. Data regarding the composition of these acids were as follows:

Table 7

| | Acid No., Mg. KOH/g. | Percent by Weight of— | | |
|---|---|---|---|---|
| | | Carbon | Hydrogen | Oxygen |
| Crystal Crop No. 1: | | | | |
| Found | 434 | 65.3 | 9.9 | 24.8 |
| Calculated for: | | | | |
| $(CH_2)_{12}(COOH)_2$ | 434 | 65.1 | 10.1 | 24.8 |
| Crystal Crop No. 2: | | | | |
| Found | 413 | 67.1 | 10.3 | 22.6 |
| Calculated for: | | | | |
| $(CH_2)_{13}(COOH)_2$ | 411 | 66.1 | 10.3 | 23.5 |

Fraction 3a of acids was crystallized from naphtha and only the first crop of crystals recovered was analyzed. This crop had an acid number of 317 and the analysis for carbon, hydrogen and oxygen showed 68.4%, 10.8% and 20.8% respectively. This corresponds to a dicarboxylic acid having 18 carbon atoms. This acid would have calculated values of 314 acid number and carbon, hydrogen and oxygen contents of 68.8%, 11.2% and 20.4%, respectively.

EXAMPLE IV

To show one of the uses of high molecular weight dicarboxylic acids produced and separated by methods described herein, a super poly amide resin was prepared using the $C_{22}$ acid recovered as crystal crop No. 2 from distillation cut 2 of Example II (Table 3).

A small glass reactor was charged with a mixture of 238 parts of the above indicated $C_{22}$ dicarboxylic acid and 128 parts of a 72% aqueous solution of hexamethylenediamine (the stoichiometric equivalent). The reactor was partially evacuated several times, the air replaced with pure nitrogen (less than 0.01% oxygen) and a slow stream of nitrogen was then constantly passed through the reactor during the subsequent treatment in order to insure the maintenance of an oxygen-free gas in the vapor space in the reactor. The contents of the reactor were then heated to 200° C. over a period of 30 minutes and maintained between 200° C. and 205° C. for six hours. At that time the reactor was evacuated using a vacuum pump and the nitrogen flow was gradually decreased until a pressure of 2 mm. of Hg was reached. The temperature was then raised to 295° C. over a 30 minute period and maintained between 295° C. and 300° C. for an additional 30 minutes. The resin at this time was a very viscous liquid.

The reactor was cooled to room temperature, broken and the resin removed. This product was a hard, extremely tough straw-colored resin adhering strongly to the surface of the glass reactor. The resin melted on heating and was capable of being drawn into a fiber. It was completely insoluble in water, ethyl or other alcohols, acetone or higher ketones and in hydrocarbon solvents, hot or cold. It was, however, readily soluble in hot 90% aqueous phenol from which it was precipitated by pouring into water or dilute alkali. In this latter operation the resin was readily formed into thin filaments or sheets using technique well known in the art.

The foregoing description and examples of this invention are not to be taken as limiting since many variations may be made by those skilled in the art without departing from the spirit or the scope of the following claims.

I claim:

1. A method of separating monohydroxy aliphatic alcohol esters of carboxylic acids free from non-acidic oxygen from a mixture of monohydroxy aliphatic alcohol esters obtained by esterifying, with a normal monohydroxy aliphatic alcohol containing 1 to 10 carbon atoms per molecule, a mixture of mono and dicarboxylic acids containing 8 to 30 carbon atoms per molecule and produced by the liquid phase air oxidation of a refined paraffin wax, which comprises contacting said mixture of esters with urea thereby forming an insoluble adduct between the urea and said esters of carboxylic acids free from non-acidic oxygen and separating said adduct from the remaining esters.

2. A method of separating carboxylic acids free from non-acidic oxygen from a mixture of carboxylic acids containing non-acidic oxygen, said mixture of acids containing acids of 8 to 30 carbon atoms and being produced by oxidizing a refined paraffin wax with a gas containing free oxygen at temperatures between 100° C. and 150° C. to an acid number between about 240 and 500 mg. KOH/g., which comprises esterifying said mixture of acids with a monohydroxy straight-chain aliphatic alcohol containing 1–10 carbon atoms per molecule and contacting the resulting mixture of esters with an alcohol slurry of urea thereby forming an insoluble adduct between the urea and the esters of said acids free from non-acidic oxygen and separating said insoluble adduct from the remaining esters.

3. A method for the recovery of carboxylic acids free from non-acidic oxygen from a complex mixture of high molecular weight carboxylic acids containing also carboxylic acids having non-acidic oxygen in their molecular structure, said complex mixture of acids being obtained by air oxidation of a refined paraffin wax in the liquid phase at a temperature between 100° C. and 140° C. to an acid number between 240 and 500 mg. KOH/g. and water washing the resulting oxidized product to remove low molecular weight acids, which method comprises contacting a low molecular weight normal monohydroxy aliphatic alcohol ester of said complex mixture of acids in solution in a light petroleum thinner with an alcoholic slurry of urea thereby forming an insoluble adduct between the esters of said carboxylic acids free from non-acidic oxygen and urea, separating said adduct from the remaining esters, decomposing said adduct to obtain the esters of acids free from non-acidic oxygen and recovering said last named acids from said esters.

4. A method for the separation of dicarboxylic acids free from non-acidic oxygen from a complex mixture of aliphatic carboxylic acids containing mono and dicarboxylic acids free from non-acidic oxygen and mono and dicarboxylic acids containing non-acidic oxygen, all of said acids having at least about 8 carbon atoms per molecule and being produced by the air oxidation of a refined paraffin wax in the liquid phase at a temperature between 100° C. and 140° C. to an acid number between 250 and 500 mg. KOH/g. and water washing the resulting oxidized paraffin wax to remove low molecular weight carboxylic acids, which method comprises treating a monohydroxy aliphatic alcohol ester of said complex mixture of acids with a slurry of urea in a low molecular weight aliphatic alcohol thereby forming an insoluble adduct with the esters of mono and dicarboxylic acids free from non-acidic oxygen, separating said adduct from the remaining esters, decomposing said adduct by treatment with water to obtain the esters, saponifying said last-named esters and acidifying the resultant soaps to obtain a mixture of mono and dicarboxylic acids free from non-acidic oxygen and separating said dicarboxylic acids from said monocarboxylic acids by fractional crystallization of said dicarboxylic acids.

5. A method according to claim 4 in which said alcohol ester of said mixture of acids is dissolved in 1 to 10 parts of a low boiling petroleum thinner prior to treatment with urea.

6. A method for the separation of substantially pure monocarboxylic acids and dicarboxylic acids free from non-acidic oxygen, and having between about 8 and 30 carbon atoms per molecule, from mono and discarboxylic acids containing non-acidic oxygen which comprises treating a normal monohydroxy aliphatic alcohol ester of a complex mixture containing each of said acids with a methanol slurry of urea thereby forming an insoluble adduct with the esters of mono and dicarboxylic acids free from non-acidic oxygen, separating said adduct from the remaining esters, decomposing said adduct by treatment with water to obtain the esters, saponifying said last-named esters and acidifying the resultant soaps to obtain a mixture of mono and dicarboxylic acids free from non-acidic oxygen, dissolving said mixture of acids in hot low boiling petroleum thinner and cooling said mixture to cause crystallization of said dicarboxylic acids, evaporating said petroleum thinner and dissolving the residue in a low boiling aliphatic alcohol at elevated temperatures and cooling said alcohol solution to effect crystallization of monocarboxylic acids contained therein, said complex mixture containing mono and dicarboxylic acids, with and without non-acidic oxygen, being obtained by oxidizing a refined paraffin wax with air in the liquid phase at a temperature between 100° C. and 140° C. until the acid number of the oxidized wax is between 250 and 375 mg. KOH/g. and water washing said oxidized wax to remove low molecular weight carboxylic acids.

7. A method according to claim 6 in which the mixture of esters is diluted with 1 to 10 volumes of a light petroleum thinner before contacting with the methanol slurry of urea.

8. A method of producing substantially pure aliphatic dicarboxylic acids free from non-acidic oxygen and having between about 8 and about 30 carbon atoms per molecule which comprises oxidizing paraffin wax in the liquid phase with a gas containing free oxygen at temperatures between about 100° C. and 150° C. until the oxidized product has an acid number between 240 and 375 mg. KOH/g., water washing the oxidized wax to remove water-soluble components, esterifying the water-insoluble fraction with a low molecular weight aliphatic alcohol, contacting the resulting esters with an alcoholic slurry of urea thereby forming insoluble adducts with carboxylic acids free from non-acidic oxygen, separating said adducts from the remaining esters, decomposing said adducts to recover the esters, saponifying and acidifying said last-named esters to obtain the corresponding acids, dissolving the resulting acids in hot low boiling petroleum thinner and cooling the thinner solution thereby crystallizing substantially pure dicarboxylic acids free from non-acidic oxygen from said thinner solution.

9. A method according to claim 8 in which said low molecular weight aliphatic alcohol is methanol.

References Cited in the file of this patent

UNITED STATES PATENTS

| | | |
|---|---|---|
| 1,828,356 | Burwell | Dec. 20, 1926 |
| 2,402,825 | Lovell et al. | June 25, 1946 |
| 2,598,953 | Weitkamp | June 3, 1952 |

OTHER REFERENCES

"Crystalline Adducts of Urea with Linear Aliphatic Compounds," Ind. Eng. Chem., col. 42, issue 7, pages 1300–1306 (1950), (Zimmerschied et al.).

"Drying Oils and Resins," Newey et al., Ind. and Eng. Chem. vol. 42, issue 7, pages 2538–2541 (1950).

"Separation and Stabilization of Fatty Acids by Urea Complexes," Schlenk et al., J. A. C. S., vol. 72 (1950), pages 5001–4.

Linstead et al.: J. Chem. Soc. (1950), pages 2987–2989.

Knight et al.: Analytic Chem., vol. 24, pages 1331–34 (August 1952).